Jan. 13, 1942.   D. KLEIST   2,269,459
TUBULAR FIBER
Filed Aug. 11, 1937
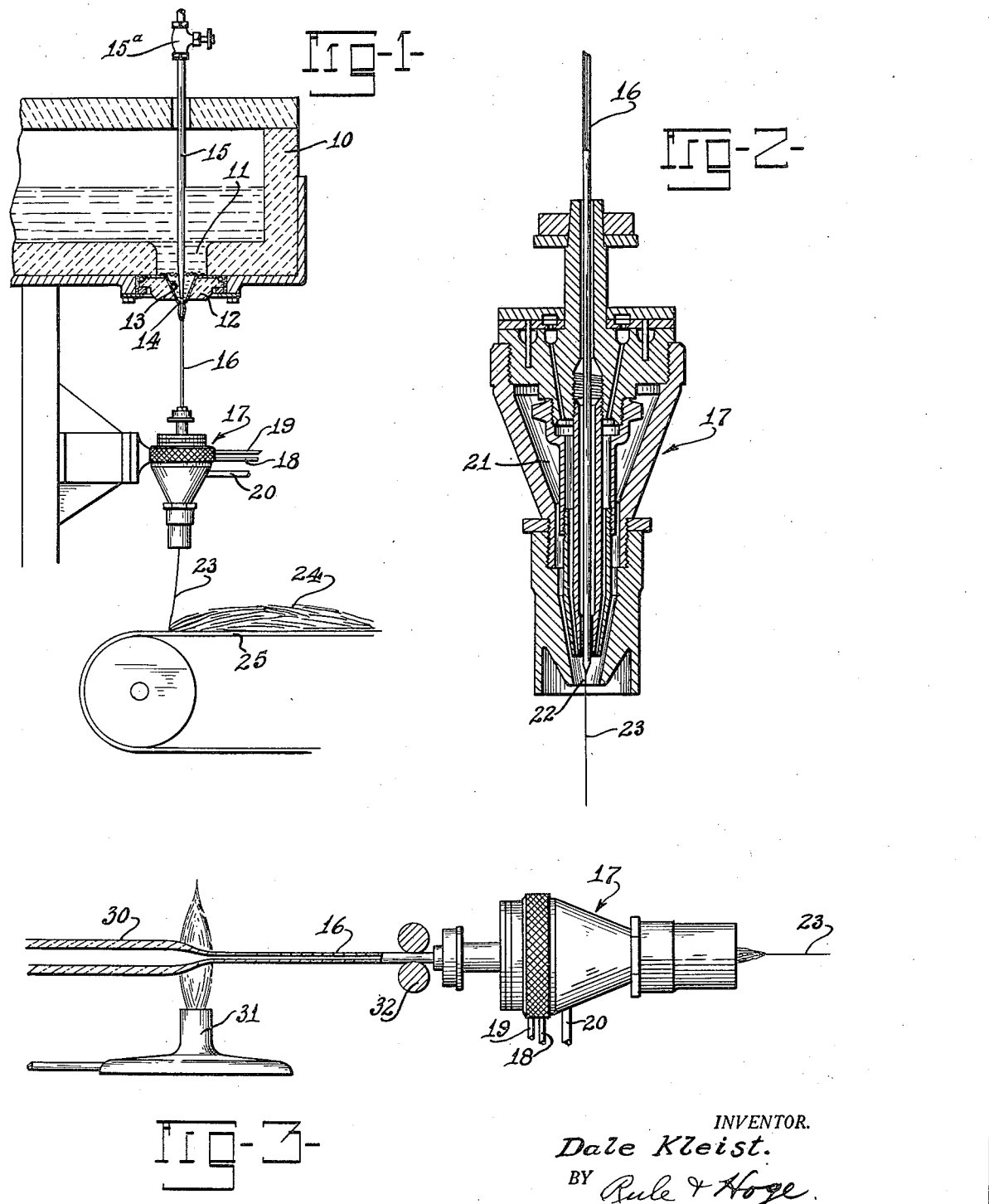
INVENTOR.
Dale Kleist.
BY Rule & Hoge
ATTORNEYS.

Patented Jan. 13, 1942

2,269,459

UNITED STATES PATENT OFFICE 2,269,459

TUBULAR FIBER

Dale Kleist, Newark, Ohio, assignor, by mesne assignments, to Owens-Corning Fiberglas Corporation, a corporation of Delaware Application August 11, 1937, Serial No. 158,495

3 Claims. (Cl. 49—77)

My invention relates to a product comprising fine fibers or filaments which are tubular or hollow, and to a method of making the same. The invention in its preferred form provides means for making extremely fine hollow glass fibers by continually reducing glass in tubular form to an extremely fine fibrous form.

At the present day, glass tubing is extensively made by flowing a tubular or hollow stream of glass from a furnace or the like and drawing and cooling the flowing glass in the form of tubing. Such method is practical for making tubes within a certain range of diameters but is wholly unsuited for making extremely fine tubes. An object of the present invention is to provide a practical method of making tubes or hollow filaments of glass or the like of microscopic fineness.

A further object of the invention is to provide a product in the nature of glass wool comprising a mass of extermely fine fibers of glass or the like in loosely matted formation in which the fibers are tubular or hollow.

Other objects of the invention will appear hereinafter.

Referring to the accompanying drawing:

Fig. 1 is a sectional elevation of apparatus for making filamentary glass tubing in accordance with the present invention;

Fig. 2 is a sectional elevation on a large scale of the implement by which a tube of glass is heated and blown or drawn to its filamentary form; and Fig. 3 is a view showing a modified method and means for making the hollow fibers.

Referring particularly to Fig. 1, a container or tank 10 provides a continuous supply of molten glass or other material which is to be reduced to hollow filamentary form. The tank as shown is made of refractory material and is provided with a passageway or opening 11 extending through the floor thereof. Beneath said opening is a refractory bushing 12 having an outlet opening extending therethrough which may be provided with a lining 13 consisting of platinum, a platinum-rhodium alloy or other suitable material. This lining material may be electrically heated if desired, for supplying heat to the issuing glass. The walls of the opening through the bushing 12 are downwardly convergent and terminate in a small outlet orifice 14 through which the glass or the like issues in a continuous stream.

A hollow mandrel 15 projects downwardly through the tank 10 and the outlet, the lower end of the mandrel extending to or through the orifice 14. Air under low pressure may be supplied through the mandrel 15 as is customary in making glass tubing to give hollow or tubular formation to the stream which is thus caused to emerge from the supply tank in the form of a hollow tube or rod 16. A valve 15ª permits control of the air supply through the mandrel 15.

The rod 16 as it is formed moves downwardly into a drawing implement or burner 17 by which it is reheated and drawn out or attenuated to the form of a fine hollow fiber or microscopic tube 23. The drawing implement 17 may be similar in construction to a conventional spray gun or machine of the type known in the trade as a metal layer machine used for feeding and melting a metal rod, reducing it to the form of a spray or vapor and spraying it onto a surface which is to be coated with the metal.

The implement 17 serves as a burner and supplies an intensely hot flame or blast for reheating the tube 16 and drawing it to filamentary form. The tube is fed downward through a central opening extending lengthwise through the burner. The flame may be produced by burning acetylene gas or other fuel gas supplied to the burner through a pipe 18 and mixed with oxygen or other combustion supporting gas supplied through a pipe 19. Air under pressure may be supplied through a pipe 20 to a pressure chamber 21. The burning gases and air under pressure issue through the nozzle 22 and thereby subject the lower end of the rod 16, as it enters said nozzle, to an intense heat. The end of the advancing rod is in this manner continuously raised to a high temperature and softened to such a degree that the force of the blast draws, attenuates or stretches it to the form of an extremely fine hollow fiber. The tube is thus continuously reduced to the form of a fiber 23 and may be practically continuous in length. The material acted upon may in this way be reduced to a fineness of a few microns in diameter. An extremely fine product is obtained when the tubing is reduced to a diameter of the order of five to ten microns. It will be understood, however, that these dimensions may be greatly increased and still produce a fine product entirely outside the range of glass tubing produced by conventional methods.

As this filamentary tubing is produced, it accumulates in bulk form or in the form of a mat or web 24 on a support 25. This support as shown consists of a continuously traveling belt conveyor by which the material as it accumulates is advanced in a continuous mat or web formation. The support 25 may be located, if desired, near enough the burner or nozzle 22 to cause the fiber 23 as it is formed to be blown against the support with considerable force. This compacts the material in a more or less matted, felted formation so that a continuous web or mat is formed. The material, either in bulk form or matted formation, has great resiliency or springiness and compressibility. The individual filaments also possess great strength and flexibility, so that they can be sharply bent or even tied into hard knots without breaking.

Fig. 3 illustrates a modification in which the supply body of glass is in the form of a hollow rod or tube 30. A burner 31 heats the rod to a temperature at which the glass is rendered soft and plastic. The rod is fed forward by a pair of feeding rolls 32 by which the softened material is drawn to the form of a comparatively fine tube 16. This tube is fed through the implement 17 which operates in the manner heretofore described, to reduce the tube to a fine filament 23.

The tube 16 whether formed by the flowing method shown in Fig. 1 or the drawing method in Fig. 3, is preferably fed through the reducing implement 17 while at a high temperature, for example, 1000° F., at which temperature the glass is rather soft and plastic but of sufficient stiffness to retain its shape as it is fed through the machine. By maintaining the rod at this high temperature, the operation of further heating it and drawing it to filamentary form can be carried on much more rapidly and effectively than could be done by feeding a cold tube through the burner 17.

Although the invention in its preferred form relates to a product consisting of glass, and to methods of treating glass as herein illustrated and described, for obtaining such product, it will be understood that it comprehends the use of other materials and methods coming within the scope of the appended claims. The invention includes, for example, any heat plastic material whether organic or inorganic, which when heated assumes a plastic or viscous state permitting a tube thereof to be drawn to a hollow fiber of the fineness indicated and which when thus drawn will quickly cool and harden by exposure to the atmosphere. The invention further contemplates the use of organic materials, such as plastics, resins and the like which may assume the form of a tube 16 and while in a soft and plastic state may be drawn by means of a blast of gas to a fiber or filament 23 of great fineness. Such filaments as they are formed, may be hardened or solidified by exposure to the atmosphere or to a drying gas by means of which volatile solvents are driven off as, for example, in the manner ordinarily employed in the manufacture of artificial silk fibers and the like.

Modifications may be resorted to within the spirit and scope of my invention.

I claim:

1. The method of producing hollow glass filaments which comprises feeding a tubular rod of glass forward lengthwise through a flame by which it is heated and softened, drawing the softened material to the form of a relatively fine tube, and applying to the forward end of said tube after it has passed beyond said flame, an intensely hot blast by which the material is reduced to a semi-fluid or viscous condition and simultaneously drawn by the force of the blast to the form of a hollow filament of microscopic fineness.

2. The method of forming tubular filamentary glass which comprises continuously attenuating a tubular body of plastic glass to reduce its diameter, directing the tubular body as it is attenuated into a blast of intensely hot gas which is at such temperature that the glass is progressively heated to a temperature at which is is semi-fluid and viscous, the temperature of the gas and rate of feeding being such that atomization of the glass is prevented and it is continuously drawn by the force of the blast to a fine filamentary form.

3. The method of producing filamentary fibrous glass which comprises continuously drawing out a body of tubular plastic glass to reduce its diameter to form a fine glass tube, directing said tube as it is attenuated into an intensely hot blast of gas and thereby progressively raising the temperature of the tube and reducing it to a semi-fluid, viscous condition, and simultaneously drawing the glass as it is thus softened to fine hollow filamentary form.

DALE KLEIST.